(12) United States Patent
Chang et al.

(10) Patent No.: US 7,342,956 B2
(45) Date of Patent: Mar. 11, 2008

(54) SYSTEM AND METHOD TO EXTRACT UPLINK STATUS FLAG BITS IN A CELLULAR WIRELESS NETWORK

(75) Inventors: Li Fung Chang, Holmdel, NJ (US); Baoguo Yang, Iselin, NJ (US); Nelson Sollenberger, Farmingdale, NJ (US)

(73) Assignee: Broadcom Corporation, Irvine, CA (US)

(*) Notice: Subject to any disclaimer, the term of this patent is extended or adjusted under 35 U.S.C. 154(b) by 813 days.

(21) Appl. No.: 10/749,492

(22) Filed: Dec. 31, 2003

(65) Prior Publication Data

US 2004/0253958 A1 Dec. 16, 2004

Related U.S. Application Data

(60) Provisional application No. 60/478,922, filed on Jun. 16, 2003.

(51) Int. Cl.
*H04B 1/38* (2006.01)
*H04L 5/16* (2006.01)

(52) U.S. Cl. .................. 375/220; 375/219; 375/222; 455/67.13

(58) Field of Classification Search ............ 375/200, 375/219, 222, 220, 227; 455/67.13; 370/469, 370/328
See application file for complete search history.

(56) References Cited

U.S. PATENT DOCUMENTS

| | | | |
|---|---|---|---|
| 6,240,304 B1 | 5/2001 | Blankenstein et al. | |
| 6,282,182 B1 * | 8/2001 | Pecen et al. ............... | 370/336 |
| 6,359,904 B1 * | 3/2002 | Hamalainen et al. ....... | 370/469 |
| 6,400,928 B1 * | 6/2002 | Khullar et al. ............. | 455/67.11 |
| 6,456,598 B1 | 9/2002 | Le Strat | |
| 6,539,205 B1 | 3/2003 | Wan | |

(Continued)

FOREIGN PATENT DOCUMENTS

EP  0 671 817 A  9/1995

(Continued)

OTHER PUBLICATIONS

Ariyavisitakul S. L., et al; "A Broadband Wireless Packet Technique Based on Coding, Diversity and Equalization"; Universal Personal Communications 1998; (p. 363-367).

*Primary Examiner*—Phuong Phu
(74) *Attorney, Agent, or Firm*—Garlick Harrison & Markison; Robert A. McLauchlan (57) ABSTRACT

Determining whether a first wireless terminal may transmit on an uplink to a servicing base station in a cellular wireless communication system includes first receiving a plurality of a Radio Frequency (RF) bursts at a wireless terminal from a servicing base station. These RF bursts carry a data block containing both Uplink Status Flag (USF) bits and Data bits. Data bits may or may not be intended for the receiving wireless terminal. The RF bursts are processed to produce the data block in an encoded format. This data block is then partially decoded to extract the USF bits when the data bits are not intended for the receiving wireless terminal. These USF bits determine when the receiving wireless terminal can transmit or uplink to the servicing base station. The partial decoding may be halted once the USF bits have been extracted from the received data block to reduce power consumption and processing requirements.

28 Claims, 9 Drawing Sheets

U.S. PATENT DOCUMENTS

| | | | |
|---|---|---|---|
| 6,658,235 B1 * | 12/2003 | Tolmunen et al. | 455/67.13 |
| 6,934,270 B2 * | 8/2005 | Demetrescu et al. | 370/328 |
| 7,068,623 B1 * | 6/2006 | Barany et al. | 370/329 |
| 7,149,245 B2 * | 12/2006 | Budka et al. | 375/227 |
| 2002/0186761 A1 | 12/2002 | Fernandez | |

FOREIGN PATENT DOCUMENTS

| | | |
|---|---|---|
| EP | 1 033 852 A1 | 2/1999 |
| EP | 1 139 614 A1 | 10/2001 |
| EP | 1 176 750 A | 1/2002 |
| GB | 2 341 296 A | 3/2000 |
| WO | WO 00/69023 | 11/2000 |
| WO | WO 01/20838 A1 | 3/2001 |
| WO | WO 01/33792 A1 | 5/2001 |
| WO | WO 02/071608 A1 | 9/2002 |

* cited by examiner

SYSTEM AND METHOD TO EXTRACT UPLINK STATUS FLAG BITS IN A CELLULAR WIRELESS NETWORK

CROSS REFERENCE TO RELATED APPLICATIONS

This application claims priority to U.S. Provisional Patent Application Ser. No. 60/478,922, filed Jun. 16, 2003, which is incorporated herein by reference for all purposes.

BACKGROUND

1. Technical Field

The present invention relates generally to cellular wireless communication systems; and more particularly to determining when a wireless terminal in a cellular wireless communication system may transmit to a servicing base station.

2. Related Art

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and a serving base station. The MSC routes voice communications to another MSC or to the PSTN. Typically, BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single base station forces the need to divide the forward and reverse link transmission times amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC). GPRS and EDGE include multiple coding/puncturing schemes and multiple modulation formats, e.g., GMSK and 8 PSK. Particular coding/puncturing schemes and modulation formats used at any time depend upon the quality of a servicing forward link channel, e.g., Signal-to-Noise-Ratio of the channel, Bit Error Rate of the channel, Block Error Rate of the channel, etc.

The GSM standard specifies communications in a time divided format (in multiple channels). The GSM standard specifies a 20 ms frame that is divided into four sub-frames, each including eight slots of approximately 625 µs in duration. Each slot corresponds to a Radio Frequency (RF) burst having a left side, a midamble, and a right side. Each set of four bursts on the forward link carry a partial link layer data block, a full link layer data block, or multiple link layer data blocks. Also included in these four bursts is control information intended for not only the wireless terminal for which the data block is intended but for other wireless terminals as well. This control information may include an Uplink Status Flag (USF) intended for each wireless terminal having access to a corresponding reverse link. The USF tells the listening wireless terminals whether the corresponding reverse link is available.

While the USF bits assists in orderly allocating reverse link resources among wireless terminals, the fact that this information may be joined with data and transmitted in four bursts may be problematic. Such is the case when the USF, control information, and data are jointly channel coded (convolutional coded) prior to transmission, as with CS-1 channel coding. The wireless terminal needs the USF bits immediately to effect a proper uplink. Thus a need exists for a means to quickly and efficiently communicate the USF to the wireless terminal without the wireless terminal performing unnecessary data processing in order to immediately effect a proper uplink while using CS-1 channel coding.

BRIEF SUMMARY OF THE INVENTION

In order to overcome the shortcomings of prior devices, the present invention provides a system and method to determine whether or not a first wireless terminal may transmit on an uplink to a servicing base station in a cellular wireless communication system. One embodiment involves receiving four (4) radio frequency (RF) bursts at a wireless terminal from a servicing base station. These 4 RF bursts carry a data block containing both Uplink Status Flag (USF) bits and Data bits. Data bits may or may not be intended for the receiving wireless terminal. The 4 RF bursts are processed to produce the data block in an encoded format. The data block is then partially decoded to extract the USF bits. The data bits may not be immediately required and are processed in the background. However, the USF bits determine when the receiving wireless terminal can transmit to the servicing base station and are immediately required. When the CS-1 coding scheme is employed, the header and data are encoded together. Thus when the coding scheme is determined to be CS-1 from a marking block, a shortened process is employed to immediately recover the USF bits while the data bits are processed in the background. This shortened process allows the wireless terminal to immediately respond to the servicing base station according to the schedule provided by the USF bits.

In a further embodiment, the data block is encoded according to both an outer encoding scheme and an inner encoding scheme. Partially decoding the data block may correspond to partially decoding the data block according to only the inner encoding scheme. In the instance of a GPRS transmission, the inner encoding scheme is convolutional encoding while the outer coding is Fire coding.

Another embodiment provides a wireless terminal. This wireless terminal includes an RF front-end operable to communicate with a servicing base station. The RF front-end is operable to receive RF bursts from the servicing base station. As before, 4 RF bursts contain a data block having USF bits and Data bits. The Data bits are not necessarily intended for this wireless terminal. The RF front-end converts these RF bursts to produce a base band signal. The base band processor, operatively coupled to the RF front-end, receives the base band signal and produces the data block in an encoded format. An enCOder/DEcoder (CODEC) processing module operably couples to the base band processor and functions to receive the encoded data block. The CODEC processing module partially decodes the data block to extract the USF bits. Additionally, the CODEC processing module may fully decode the data bits in the background and encode outgoing data bits to produce outgoing encoded data blocks. The CODEC processing module need not immediately decode data blocks once the USF bits have been extracted. By shifting the decoding process to the background, important timing considerations of the wireless terminal can be met.

The data block may correspond to a GSM frame with each RF burst corresponding to a GSM sub-frame. This allows the wireless terminal to support the GSM standard. In particular, the data block may be encoded according to the CS-1 encoding scheme of the GPRS portion of the GSM standard.

In yet another embodiment, a wireless terminal is provided that includes a radio frequency front-end operable to communicate with the servicing base station. The RF front-end receives RF bursts from the servicing base station. The RF bursts contain data block(s) having USF bits and Data bits. The RF front-end converts these RF bursts to produce a base band signal. The baseband processor, operatively coupled to the RF front-end receives the base band signal and produces the data block in an encoded format. The baseband processor partially decodes the data block to extract the USF bits. The baseband processor may fully decode data blocks carrying data bits intended for the receiving wireless terminal in the background and encode outgoing data bits to produce outgoing data block in an encoded format. In still another embodiment, a system processor or another component of the wireless terminal has responsibility of the partial decoding operations.

Other features and advantages of the present invention will become apparent from the following detailed description of the invention made with reference to the accompanying drawings.

DETAILED DESCRIPTION OF THE DRAWINGS

Figure 1:
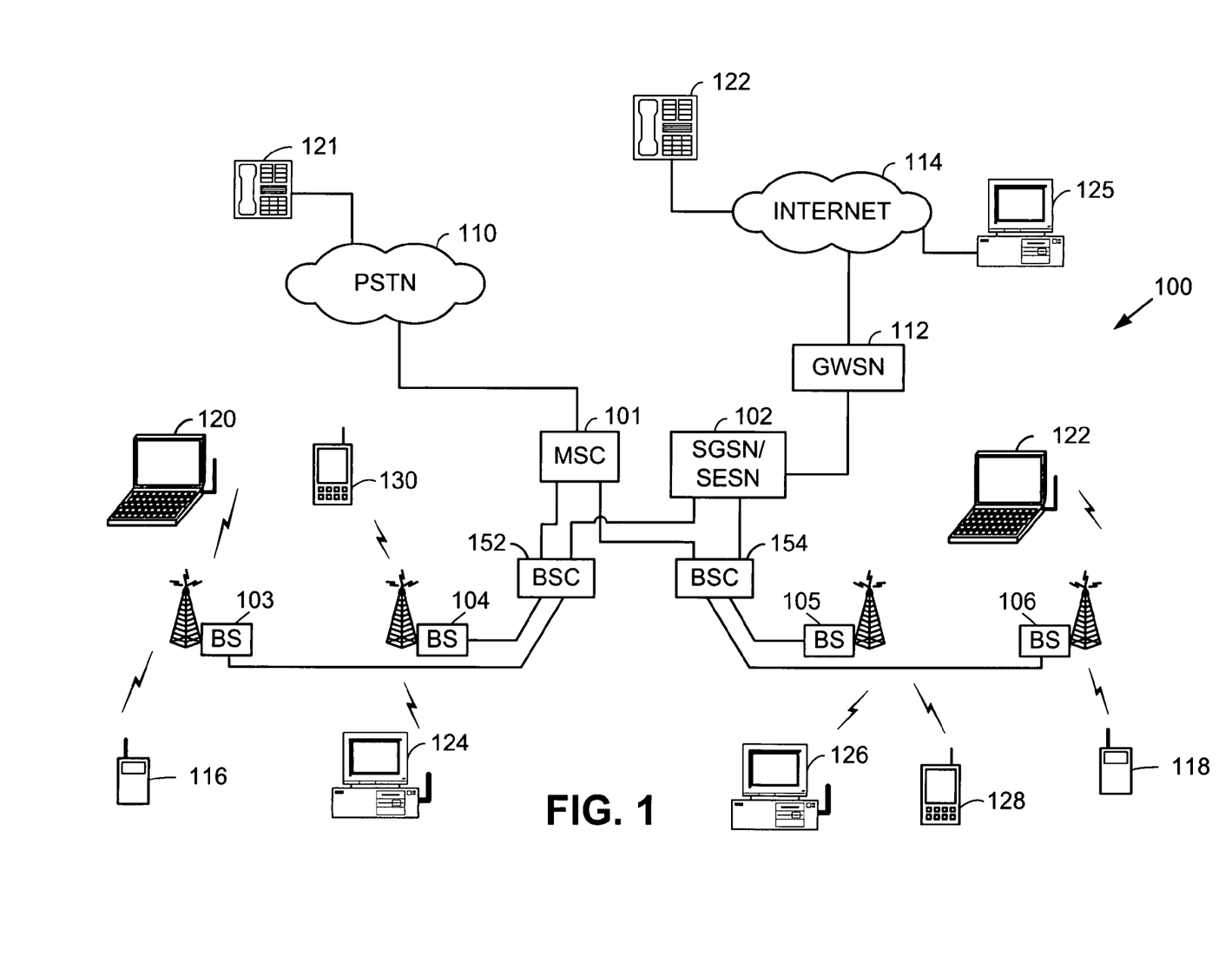
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc. In general, the teachings of the present invention apply to how the wireless terminal determines its uplink schedule while reducing power consumption.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the GPRS and/or EDGE operating standard as well as supporting the voice servicing portions the GSM standard.

In particular, the wireless terminals 116-130 support the pipelined processing of received RF bursts in slots of a GSM frame so that a plurality of slots in each sub-frame of a GSM frame are allocated for forward link transmissions to a single wireless terminal. In one particular embodiment, a number of slots of a GSM frame are allocated for forward link transmissions to a wireless terminal such that the wireless terminal must receive and process a number of RF bursts, e.g., 2, 3, 4, or more RF bursts, in each sub-frame of the GSM frame. The wireless terminal is able to process the RF bursts contained in these slots and still service reverse link transmissions and the other processing requirements of the wireless terminal.

Figure 2:
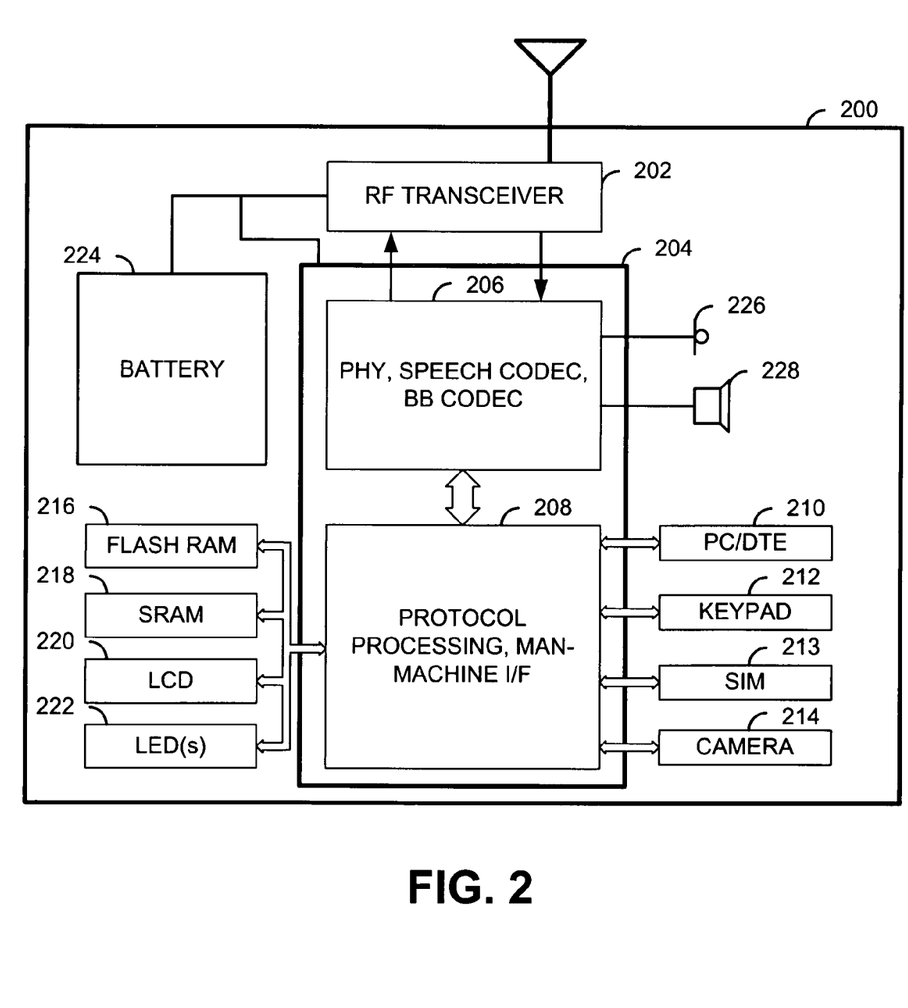
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a housing. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
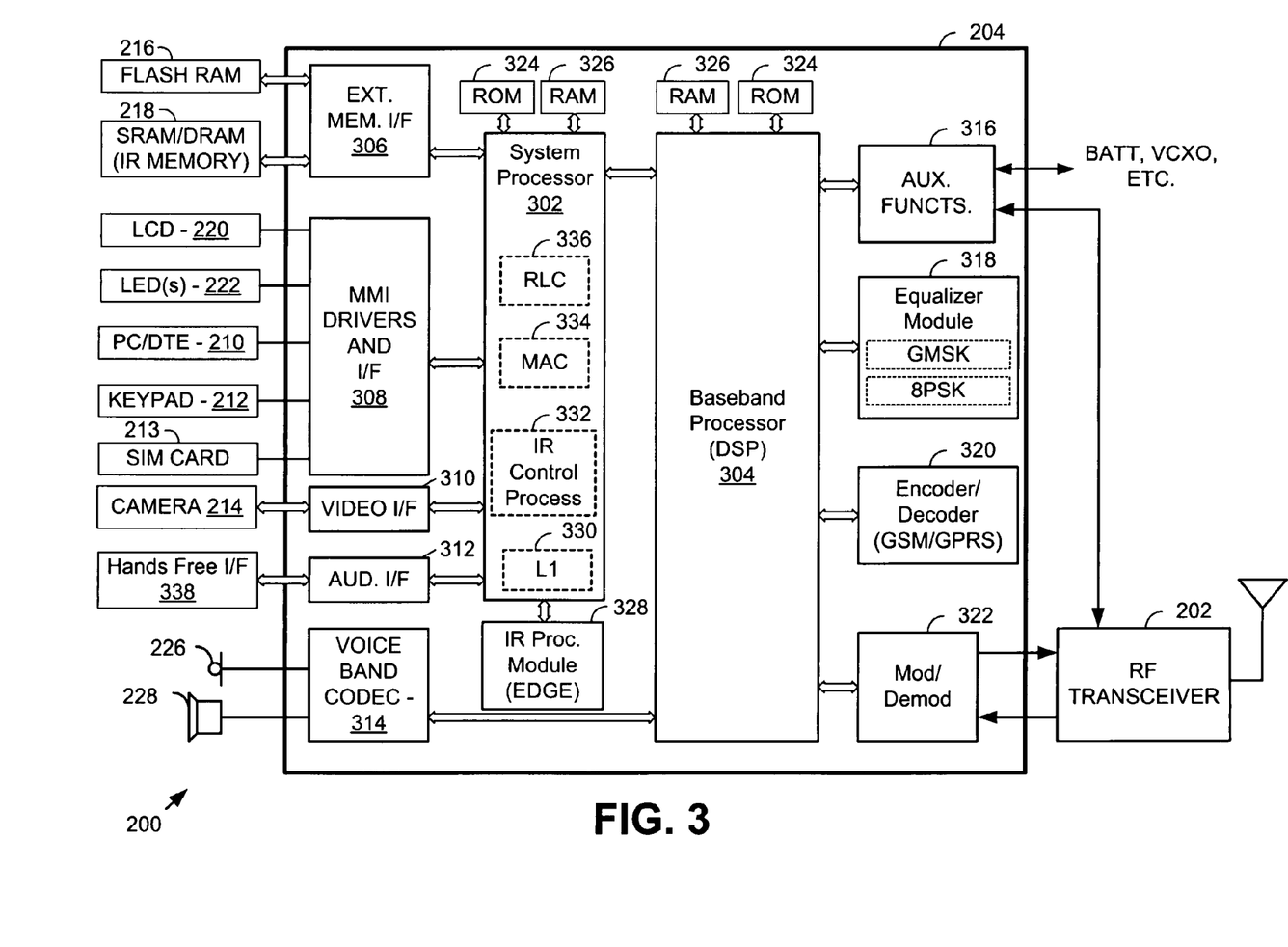
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an enCOder/DECoder (CODEC) processing module 320, and an Incremental Redundancy (IR) processing module 328. The interconnections of FIG. 3 are one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 coupled to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. In particular the system processor 302 services Layer 1 (L1) operations 330, a portion of Incremental Redundancy (IR) GSM protocol stack operations 332 (referred to as "IR control process"), Medium Access Control (MAC) operations 334, and Radio Link Control (RLC) operations 336. The baseband processor 304 in combination with the modulator/demodulator 322, RF transceiver, equalizer module 318, and/or encoder/decoder module 320 service the Physical Layer (PHY) operations performed by the digital processing components 204. The baseband processor 304 may also services a portion of the GSM/GPRS/EDGE protocol stack.

Still referring to FIG. 3, the baseband processor 304 controls the interaction of the baseband processor 304 and equalizer module 318. As will be described further with reference to FIGS. 5-7B, the baseband processor 304 is responsible for causing the equalizer module 318 and the CODEC processing module 320 to process received RF bursts that reside within slots of a GSM frame. In the particular embodiment of FIGS. 2 and 3, with single RF front end 202, wireless terminal 200 may receive and process RF bursts in up to four slots of each sub-frame of a GSM frame, i.e., be assigned four slots for forward link transmissions in any particular GSM frame. In another embodiment in which the wireless terminal 200 includes more than one RF front end, the wireless terminal 200 may be assigned more than four slots in each sub-frame of the GSM frame. In this case, required transmit operations would be performed using a second RF front end while a first RF front end would perform the receive operations. When the forward link transmissions and the reverse link transmissions occupy different channels with sufficient frequency separation, and the wireless terminal otherwise supports full duplex operations, the wireless terminal could receive and transmit at the same time.

Figure 4:
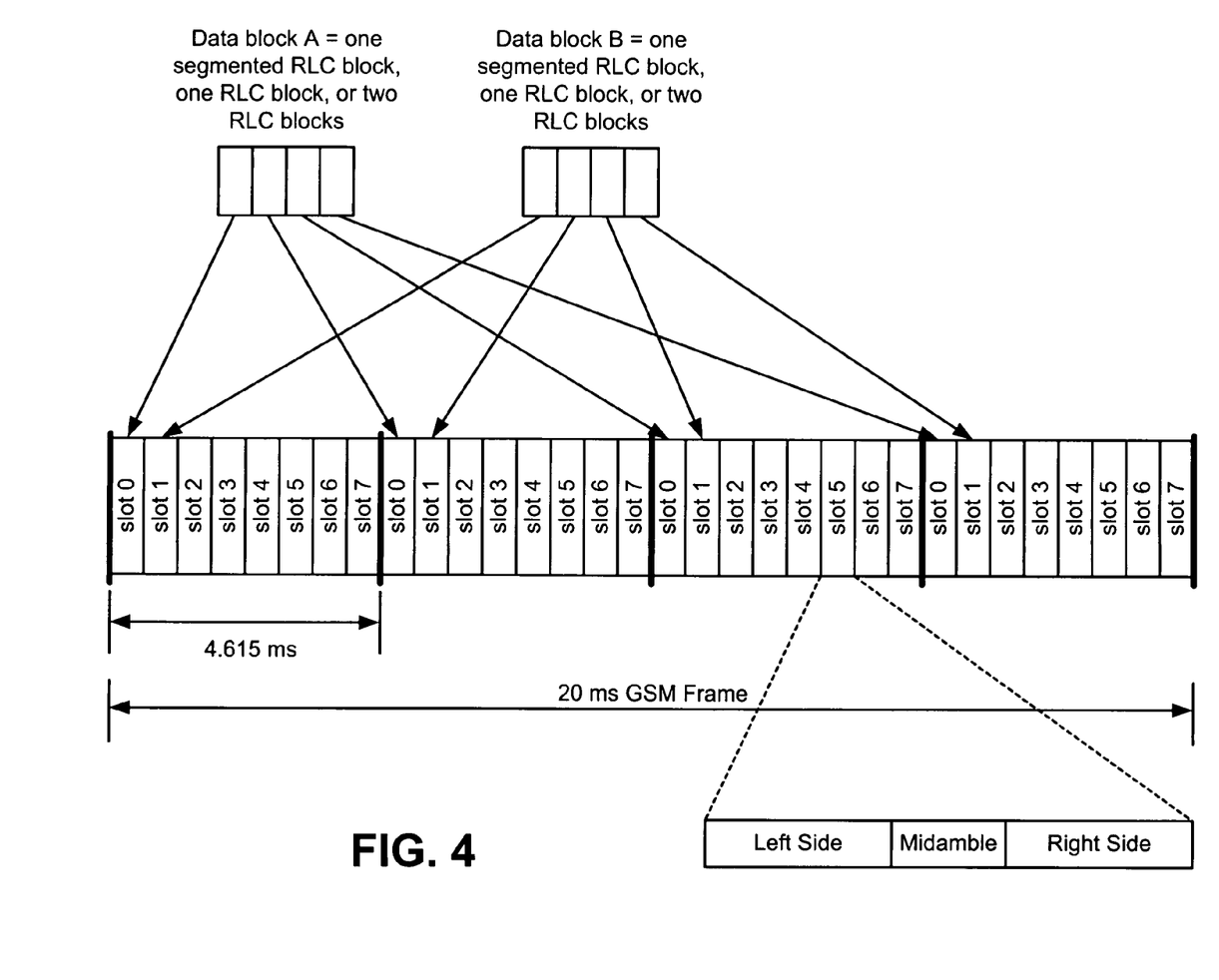
FIG. 4 is a block diagram illustrating the general structure of a GSM frame and the manner in which data blocks are carried by the GSM frame.

FIG. 4 is a block diagram illustrating the general structure of a GSM frame and the manner in which data blocks are carried by the GSM frame. The GSM frame is 20 ms in duration, including guard periods, is divided into four sub-frames, and includes eight slots, slots 0 through 7, in each sub-frame. Each slot is approximately 577 μs in duration, includes a left side, a midamble, and a right side. The left side and right side of an RF burst of the time slot carry data while the midamble is a training sequence.

The RF bursts of four time slots of the GSM frame carry a segmented RLC block, a complete RLC block, or two RLC blocks, depending upon a supported Modulation and Coding Scheme (MCS) mode or GPRS CS-n mode, e.g., CS-1, CS-2. For example, data block A is carried in slot 0 of sub-frame 1, slot 0 of sub-frame 2, slot 0 of sub-frame 3, and slot 0 of sub-frame 3. Data block A may carry a segmented RLC block, an RLC block, or two RLC blocks. Likewise, data block B is carried in slot 1 of sub-frame 1, slot 1 of sub-frame 2, slot 1 of sub-frame 3, and slot 1 of sub-frame 3. The MCS mode or CS mode of each set of slots, i.e., slot n of each sub-frame, for the GSM frame is consistent for the GSM frame. Further, the MCS mode or CS mode of differing sets of slots of the GSM frame, e.g., slot 0 of each sub-frame vs. any of slots 1-7 of each sub-frame, may differ. As will be described further with reference to FIG. 5, the wireless terminal 200 may be assigned multiple slots for forward link transmissions that must be received and processed by the wireless terminal 200.

Figure 5:
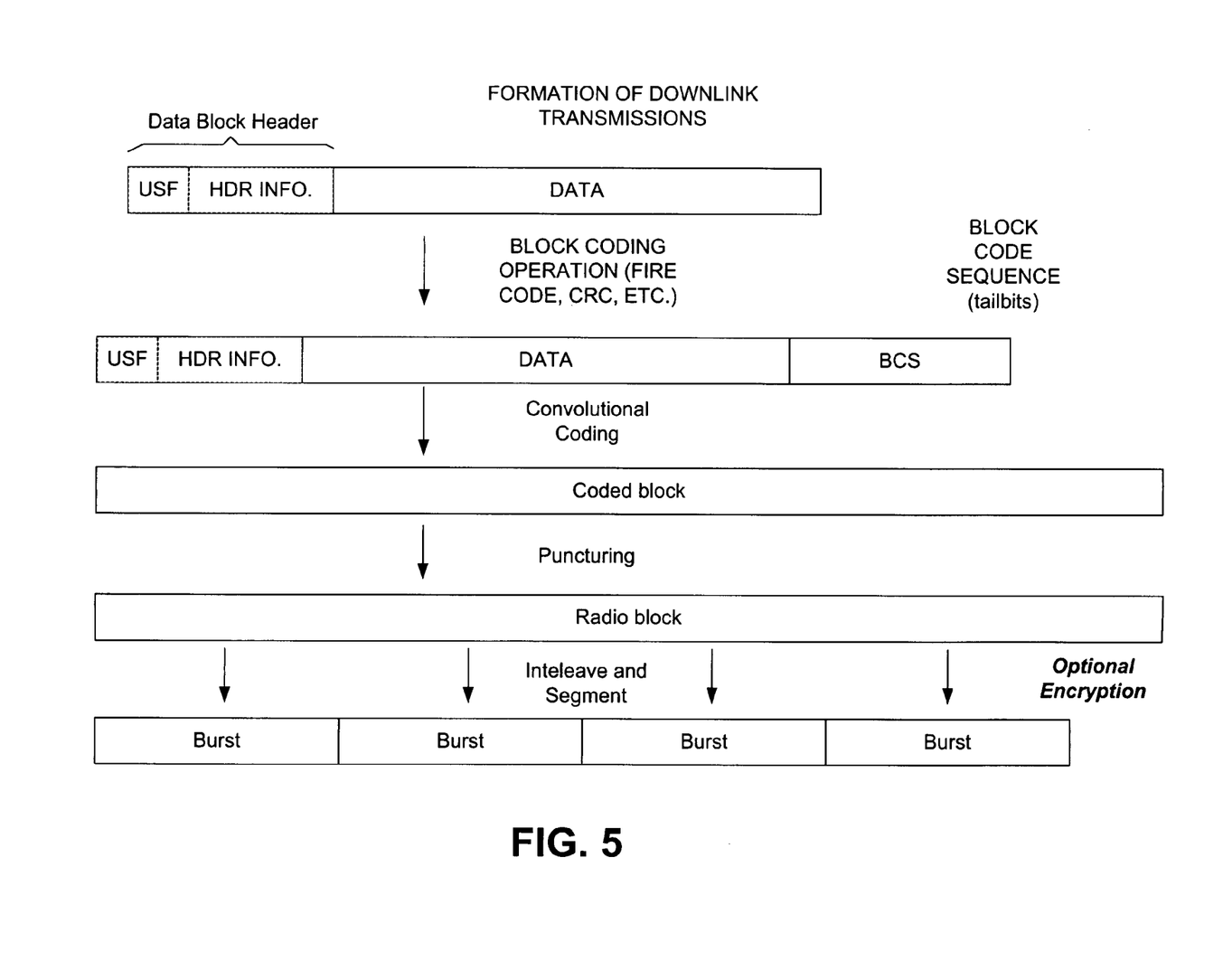
FIG. 5 is a block diagram illustrating the formation of down link transmissions.

FIG. 5 depicts the various stages associated with mapping data into RF bursts. A Data Block Header and Data are initially uncoded. The Data Block Header contains Uplink Status Flags (USF) bits and other header information. The block coding operations perform the outer coding for the data block and support error detection/correction for data block. The outer coding operations typically employ a cyclic redundancy check (CRC) or a Fire Code. The outer coding operations are illustrated to add tail bits and/or a Block Code Sequence (BCS), which is/are appended to the Data. In CS-1, the header and data are coded together using block coding and convolutional coding. In non-CS-1 coding schemes, the USF bits may be placed at specific known positions, depending on the coding scheme. Additionally, in these non-CS-1 coding schemes, the header and data is often coded separately With GPRS operation, the Fire Codes allow for either error correction or error detection. In one embodiment, the Fire Code is a shortened binary cyclic code that appends 40 redundancy bits to 184 bits of the data Header and Data. The pure error detection capability of Fire Coding is sufficient to let undetected errors go through with only a probability of $2^{-40}$. After block coding has supplemented the Data with redundancy bits for error detection, calculation of additional redundancy for error correction to correct the transmissions caused by the radio channels. The internal error correction or coding scheme of GSM is based on convolutional codes.

Some redundant bits generated by the convolutional encoder are punctured prior to transmission. Puncturing increases the rate of the convolutional code and reduces the redundancy per data block transmitted. Puncturing additionally lowers the bandwidth requirements such that the convolutional encoded signal fits into the available channel bit stream. The convolutional encoded punctured bits are passed to an interleaver, which shuffles various bit streams and segments the interleaved bit streams into the 4 bursts shown.

Figure 6:
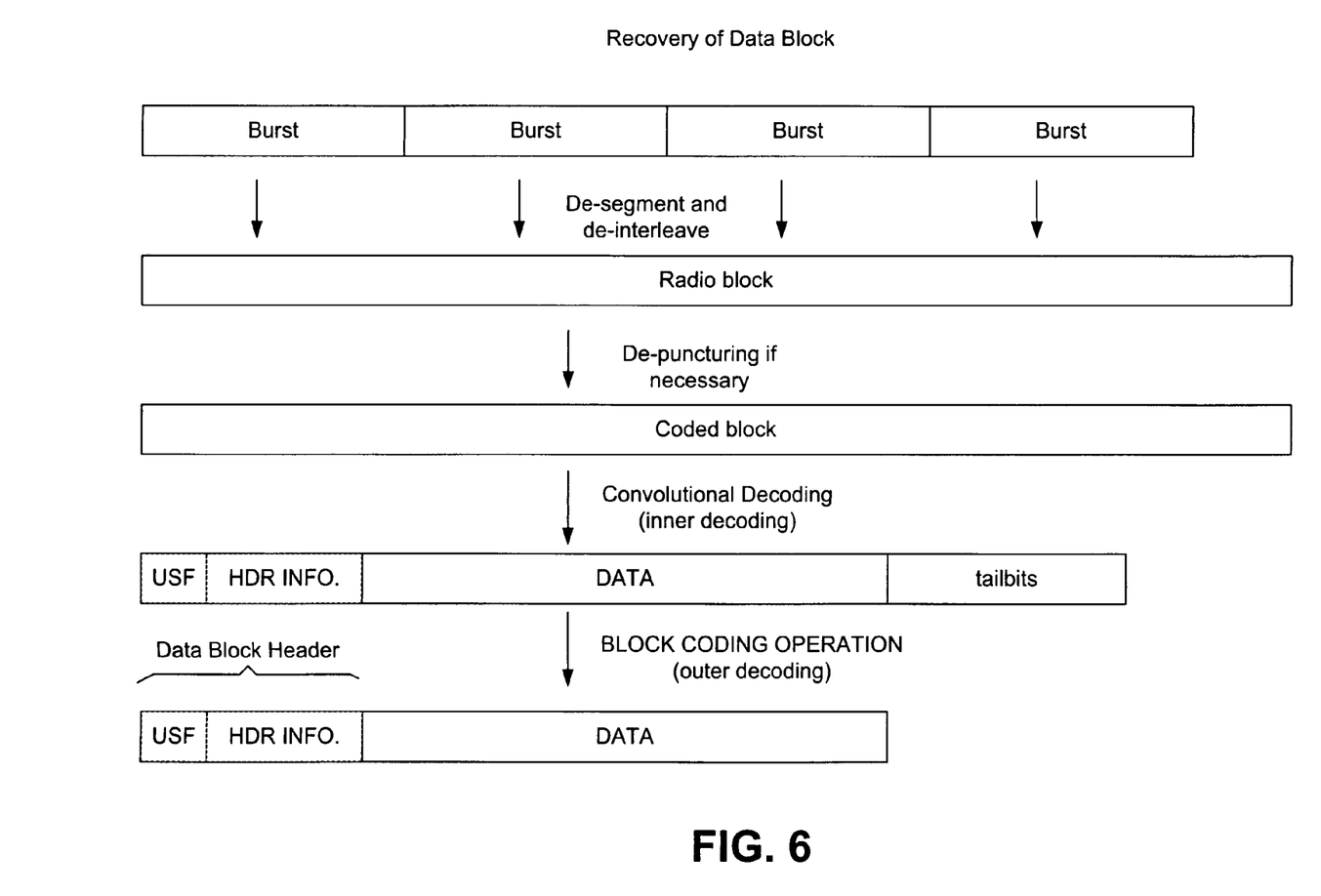
FIG. 6 is a block diagram illustrating the stages associated with recovering a data block from a series of RF bursts.

FIG. 6 is a block diagram depicting the various stages associated with recovering a data block from an RF burst. Four RF bursts making up a data block are received and processed. Once all four RF bursts have been received, the RF bursts are combined to form an encoded data block. The encoded data block is then depunctured (if required), decoded according to an inner decoding scheme, and then decoded according to an outer decoding scheme. The decoded data block includes the data block header and the data.

When the data block does not include data intended for a wireless terminal, the wireless terminal may be concerned only with the USF bits contained within the header. The USF bits indicate whether a corresponding uplink is being used and, if it is, the identity of a wireless terminal currently allowed to use the uplink. Depending on how the data and header are coded, partial decoding may be possible to identify data not intended for the receiving wireless terminal. In one embodiment, USF bits consist of three bits located at the beginning of each radio block transmitted on the downlink. This embodiment enables coding eight different USF states, which are used to direct uplink traffic. More specifically, the USF bits tell multiple wireless terminals how to communicate with the servicing base station according to a predetermined schedule. If a wireless terminal were to attempt to uplink to a servicing base station when the uplink channel was assigned to another wireless terminal, the result of two wireless terminals transmitting would be garbled or unusable communications between the wireless terminals involved. Thus, it is important for each wireless terminal to properly identify when it may uplink to the servicing base station.

Since USF bits are contained at the beginning of each radio block sent on the downlink, one can appreciate that only the USF bits need be extracted from the beginning of each radio block in order to determine when a wireless terminal may transmit to a servicing base station. Further, one should appreciate the need to immediately identify and decode the USF bits, should the wireless terminal need to immediately transmit to the servicing base station. By extracting the USF bits from the interleaved, coded data blocks, the receiving wireless terminal may identify the schedule associated with its transmissions to the servicing base station.

Figure 7A:
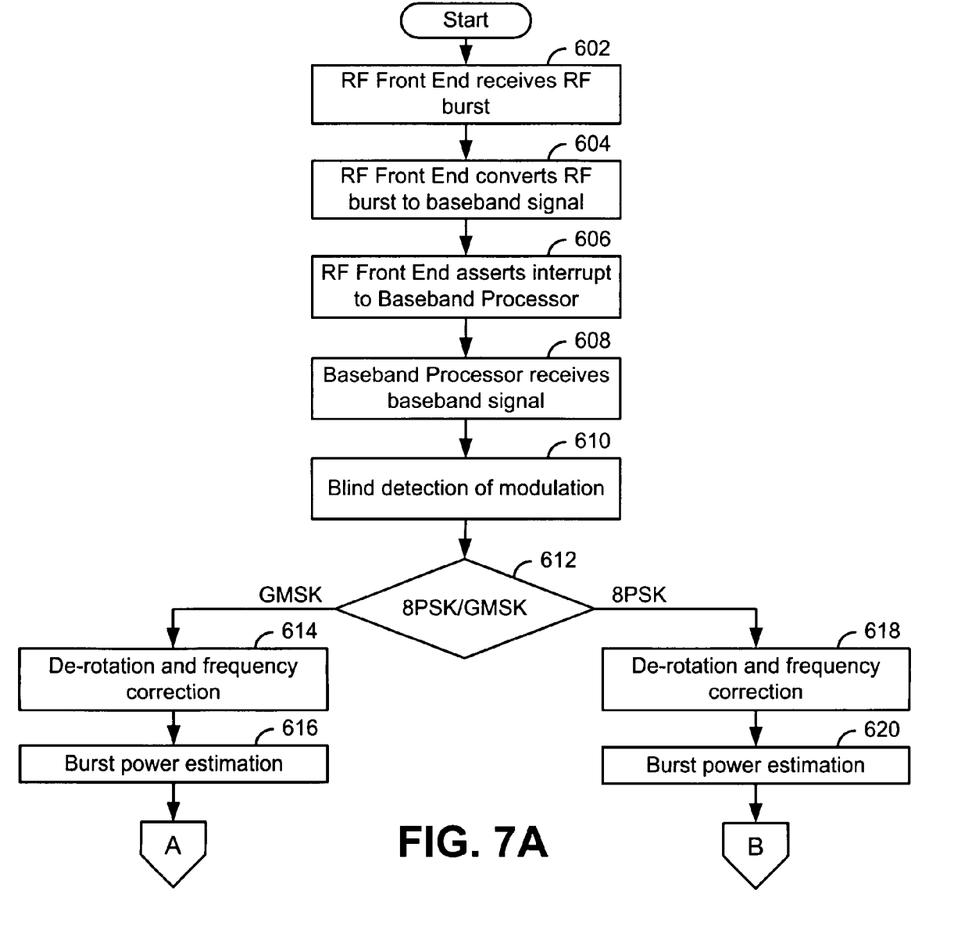
FIGS. 7A and 7B are flow charts illustrating operation of a wireless terminal in receiving and processing a RF burst.
Figure 7B:
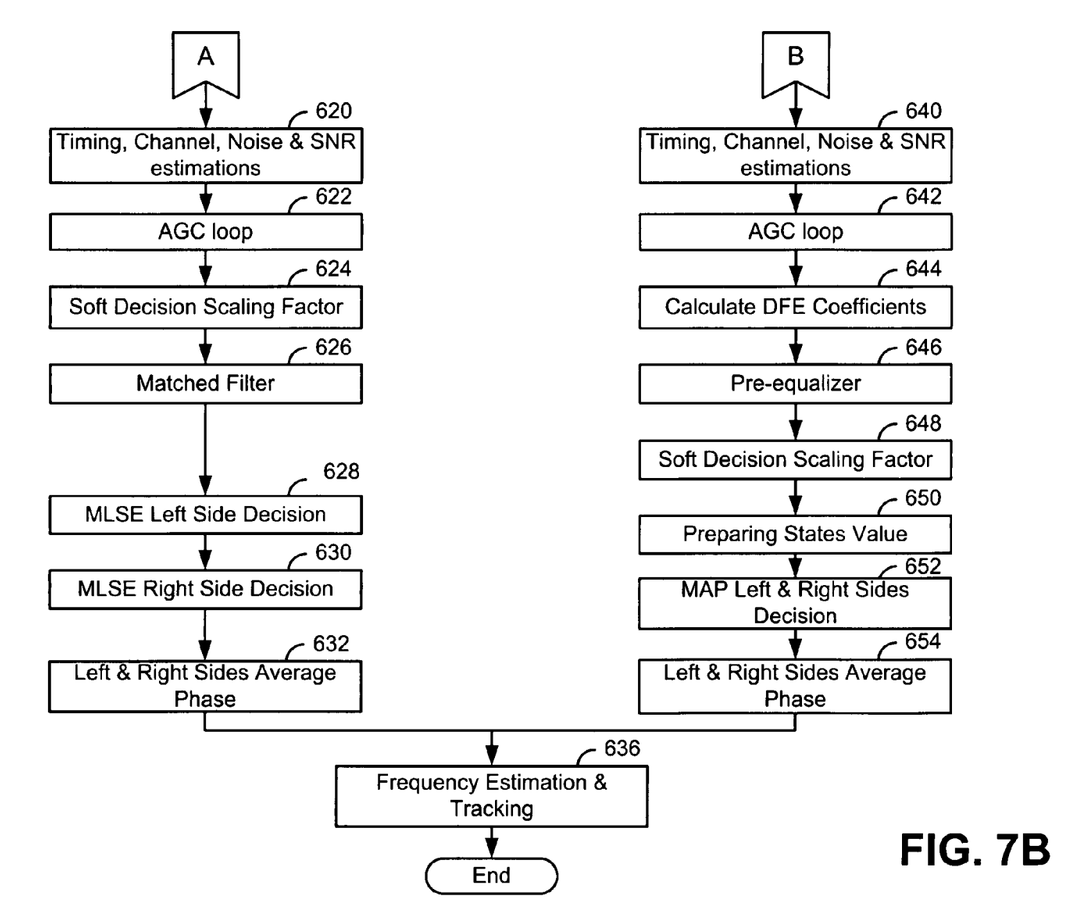

FIGS. 7A and 7B are flow charts illustrating operation of a wireless terminal 200 in receiving and processing a RF burst. The operations illustrated in FIG. 7A to 7B correspond to a single RF burst in a corresponding slot of GSM frame. The RF front end 202, the baseband processor 304, and the equalizer module 318 illustrated in FIG. 3 perform these operations. These operations are generally called out as being performed by one of these components. However, the split of processing duties among these various components may differ without departing from the scope of the present invention.

Referring particular to FIG. 7A, operation commences with the RF front end 202 receiving an RF burst in a corresponding slot of a GSM frame (step 602). The RF front end 202 then converts the RF burst to a baseband signal (step 604). Upon completion of the conversion, the RF front end 202 sends an interrupt to the baseband processor 304 (step 606). Thus, as referred to in FIG. 7A, the RF front end 202 performs steps 602-606.

Operation continues with the baseband processor 304 receiving the baseband signal (step 608). In a typical operation, either the RF front end 202, the baseband processor 304, or modulator/demodulator 322 will sample the analog baseband signal to digitize the baseband signal. After receipt of the baseband signal (in a digitized format), the baseband processor 304 performs blind detection of a modulation format of the baseband signal (step 610). This blind detection of the modulation format determines the modulation format of the corresponding baseband signal. In one particular embodiment according to the GSM standard, the modulation format will be either Gaussian Minimum Shift Keying (GMSK) modulation or Eight Phase Shift Keying (8 PSK) modulation. The baseband processor 304 makes the determination (step 612) and proceeds along one of two branches based upon the detected modulation format.

For GMSK modulation, the baseband processor 304 performs de-rotation and frequency correction of the baseband signal (step 614). Next, the baseband processor 304 performs burst power estimation of the baseband signal (step 616). Referring now to FIG. 7B via off page connector A, the baseband processor 304 next performs timing, channel, noise, and signal-to-noise ratio (SNR) estimation (step 620). Subsequently, the baseband processor 304 performs automatic gain control (AGC) loop calculations (step 622). Next, the baseband processor 304 performs soft decision scaling factor determination on the baseband signal (step 624). After step 624, the baseband processor 304 performs matched filtering operations on the baseband signal (step 626).

Steps 608-626 are referred to hereinafter as pre-equalization processing operations. With the baseband processor 304 performing these pre-equalization processing operations on the baseband signal it produces a processed baseband signal. Upon completion of these pre-equalization processing operations, the baseband processor 304 issues a command to the equalizer module 318.

The equalizer module 318, upon receiving the command, prepares to equalize the processed baseband signal based upon the modulation format, e.g., GMSK modulation or 8 PSK modulation. The equalizer module 318 receives the processed baseband signal, settings, and/or parameters from the baseband processor 304 and performs Maximum Likelihood Sequence Estimation (MLSE) equalization on the left side of the baseband signal (step 628). As was shown previously with reference to FIG. 4, each RF burst contains a left side of data, a midamble, and a right side of data. At step 628, the equalizer module 318 equalizes the left side of the RF burst to produce soft decisions for the left side. Then, the equalizer module 318 equalizes the right side of the processed baseband signal (step 630). The equalization of the right side produces a plurality of soft decisions corresponding to the right side.

The equalizer module 318 then issues an interrupt to the baseband processor 304 indicating that the equalizer operations are complete for the RF burst. The baseband processor 304 then receives the soft decisions from the equalizer module 318. Next, the baseband processor 304 determines an average phase of the left and right sides based upon the soft decisions received from the equalizer module 318 (step 632). The baseband processor 304 then performs frequency estimation and tracking based upon the soft decisions received from the equalizer module 318 (step 636). The operations of step 632 (or step 654) and step 636 are referred to herein as "post-equalization processing." After operation at step 636, processing of the particular RF burst is completed.

Referring again to FIG. 7A, the baseband processor 304 and equalizer module 318 take the right branch from step 612 when an 8 PSK modulation is blindly detected at step 610. In the first operation for 8 PSK modulation, the baseband processor 304 performs derotation and frequency correction on the baseband signal (step 618). The baseband processor 304 then performs burst power estimation of the baseband signal (step 620). Referring now to FIG. 7B via off page connector B, operation continues with the baseband processor 304 performing timing, channel, noise, and SNR estimations (step 640). The baseband processor 304 then performs AGC loop calculations on the baseband signal (step 642). Next, the baseband processor 304 calculates Decision Feedback Equalizer (DFE) coefficients that will be used by the equalizer module 318 (step 644). The baseband processor 304 then performs pre-equalizer operations on the baseband signal (step 646). Finally, the baseband processor 304 determines soft decision scaling factors for the baseband signal (step 648). Steps 618-648 performed by the baseband processor 304 are referred to herein as "pre-equalization processing" operations for an 8 PSK modulation baseband signal. Upon completion of step 648, the baseband processor 304 issues a command to equalizer module 318 to equalize the processed baseband signal.

Upon receipt of the command from the baseband processor 304, the equalizer module 318 receives the processed baseband signal, settings, and/or parameters from the baseband processor 304 and commences equalization of the processed baseband signal. The equalizer module 318 first prepares state values that it will use in equalizing the 8 PSK modulated processed baseband signal (step 650). In the illustrated embodiment the equalizer module 318 uses a Maximum A posteriori Probability (MAP) equalizer. The equalizer module 318 then equalizes the left and right sides of the processed baseband signal using the MAP equalizer to produce soft decisions for the processed baseband signal (step 652). Upon completion of step 654, the equalizer module 318 issues an interrupt to the baseband processor 304 indicating its completion of equalizing the processed baseband signal corresponding.

The baseband processor 304 then receives the soft decisions from the equalizer module 318. Next, the baseband processor 304 determines the average phase of the left and right sides of the processed baseband signal based upon the soft decisions (step 654). Finally, the baseband processor 304 performs frequency estimation and tracking for the soft decisions (step 636). The operations of steps 654 and 636 are referred to as post-equalization processing operations. From step 636, operation is complete for the particular RF burst depicts the various stages associated with recovering a data block from an RF Burst.

While the operations of FIGS. 7A and 7B are indicated to be performed by particular components of the wireless terminal, such segmentation of operations could be performed by differing components. For example, the equalization operations could be performed by the baseband processor 304 or system processor 302 in other embodiments. Further, decoding operations could also be performed by the baseband processor 304 or the system processor 302 in other embodiments.

Figure 8:
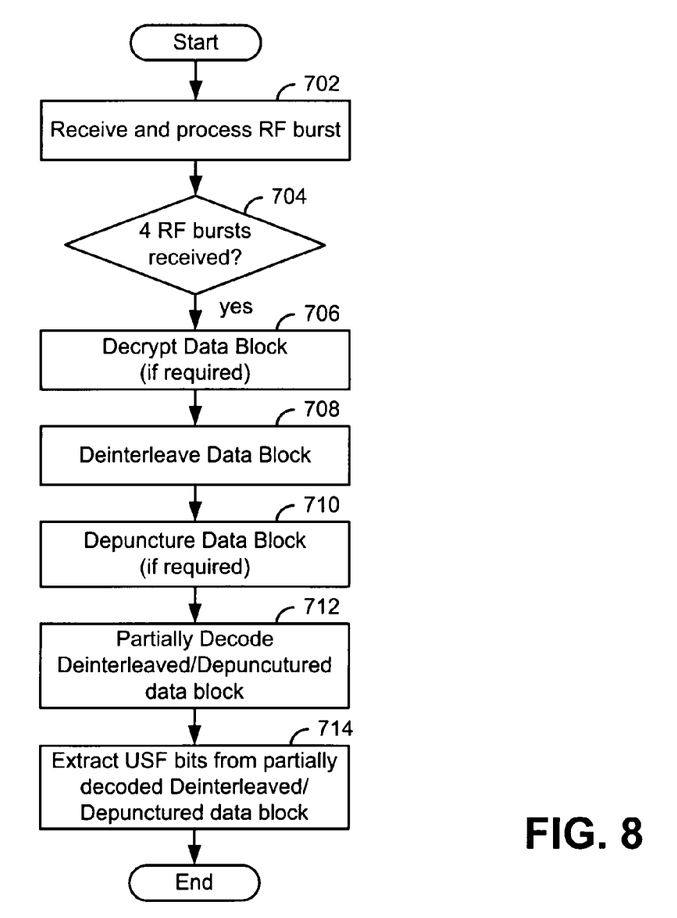
FIG. 8 is a flow chart illustrating operations to extract USF bits according to an embodiment of the present invention.

FIG. 8 is a flow chart illustrating operations to extract USF bits according to an embodiment of the present invention. Operations commence receiving and processing an RF burst in steps 702 and as described with reference to FIGS.

7A and 7B. When the block is complete, as determined at step 704, operation proceeds to step 706.

Marking bits will identify the coding scheme of the data block. For example, the coding scheme may be any one of the CS-1 through CS-4 or MCS-1 through MCS-9 coding schemes. In all of these coding schemes, except for CS-1, the USF bits are located at a known position and are also protected by preceding. This fact allows the USF bits to be easily extracted and decoded in these coding schemes. However, in CS-1, the header and data are coded together and this CS-1 channel coding protects the USF bits. As the CS-1 coding may be used to carry all control and configuration information, one can appreciate that timing is critical for GPRS and EDGE multi-slot operations. Thus, CS-1 coding requires special processing to quickly extract the USF bits if the wireless terminals are to meet timing requirements for the wireless terminal to transmit immediately to the servicing base station.

In CS-1 coding, the USF bits are protected by convolutional coding and error correction coding. Decoding must be performed, at least partially, to extract these USF bits. This differs from CS-2 through CS-4 and MCS-1 through MCS-9, where the USF bits are located in known positions and are protected by a strong precoding scheme. By locating this information in specific positions, the USF bits in non CS-1 coding schemes are easily extracted. However, for CS-1, the USF bits are extracted by partially decoding the CS-1 encoded data block (step 714). The remaining header and data bits may be left for further background processing when processor time is available. For CS-1 encoded data, this processing must occur to determine if the data is intended for the receiving wireless terminal.

When MCS-5 through MCS-9 are employed, the header and data are coded separately. This allows the header to be decoded and evaluated. As the header contains information indicating if the data is intended for the receiving wireless terminal, the data need not be decoded when the data is not intended for the receiving wireless terminal. By not performing these decoding operations for these non-CS-1 coding schemes, power consumption and processing requirements of the wireless terminal are reduced. Additionally, resources associated with normal block processing of a data block not intended for the receiving wireless terminal are freed for other uses. This allows the wireless terminals to achieve an extended battery life by not performing an inner decode of a data block and an outer decode of a data block not intended for the receiving wireless terminal.

Recovery of the USF bits begins in step 706 where, if necessary, the data block is decrypted. The data block is then de-interleaved (step 708). MCS-1 through MCS-4 and CS-1 through CS-4 interleave the header and data. This requires de-interleaving when receiving data blocks coded in these coding schemes. If necessary, the data block is then de-punctured to produce a convoluted data block (step 710). At step 712, a partial decode of the de-interleaved and de-punctured data block commences. For a GPRS CS-1 encoded data block, for example, having three USF bits, a full decode of the data block may require 228 decoding steps. However, for the partial decoding operations of the present invention, the USF bits are decoded and may be extracted in only 20 decoding steps, for example.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method to determine whether a first wireless terminal may transmit on an uplink to a servicing base station in a cellular wireless communication system, the method comprises:

receiving four Radio Frequency (RF) bursts from the servicing base station, wherein the four RF bursts carry a data block that includes:

Unlink State Flag (USF) bits; and

Data bits intended for a second wireless terminal;

processing the four RF bursts to produce the data block in an encoded format, wherein processing the four RF bursts to produce the data block comprises:

for each of four received RF bursts:

down converting each RF burst to produce a baseband signal;

sampling the baseband signal to produce a plurality of samples;

pre-equalization processing the plurality of samples; and equalizing the plurality of samples to produce a plurality of soft decisions corresponding to the RF burst;

combining the plurality of soft decisions of the four RF bursts to form the data block; and de-interleaving the data block; and partially decoding the data block in the encoded format to extract the USF bits; and using the USF bits to determine whether the first wireless terminal may transmit on the uplink to the servicing base station.

2. The method of claim 1 further comprises decoding the data block in the background when the USF bits have been extracted from the data block.

3. The method of claim 1, wherein the data block corresponds to a GSM frame and each RF burst corresponds to a GSM sub-frame of the GSM frame.

4. The method of claim 1, wherein the first wireless terminal is a wireless terminal that operates according to the GSM standard.

5. The method of claim 1, wherein the data block is encoded according to a CS-1 encoding scheme of a GPRS portion of the GSM standard.

6. The method of claim 1, wherein:
the data block is encoded according to both an outer encoding scheme and an inner encoding scheme; and
partially decoding the data block includes partially decoding the data block according to only the inner encoding scheme.

7. The method of claim 6, wherein:
the outer encoding scheme comprises a linear binary block coding scheme; and
the inner encoding scheme comprises convolutional encoding.

8. The method of claim 6, wherein:
the outer encoding scheme comprises Fire encoding; and
the inner encoding scheme comprises convolutional encoding.

9. The method of claim 1, further comprising deinterleaving the data block prior to partially decoding the data block.

10. The method of claim 1, wherein the USF bits indicate:
whether a corresponding uplink is available; and
when the corresponding uplink is not available, an indication of a wireless terminal using the uplink.

11. A wireless terminal that comprises:
a Radio Frequency (RF) front end operable to communicate with a servicing base station, wherein the RF front is operable to receive four RF bursts from the servicing base station that carries a data block having Uplink State Flag (USF) bits and data bits intended for a differing wireless terminal and to down convert the four RF bursts to produce a baseband signal, wherein processing the four RF bursts to produce the baseband signal comprises for each of four received RF bursts down converting each RF burst to produce a baseband signal;
a baseband processor communicatively coupled to the RF front end that is operable to receive the baseband signal from the RF front end and to process the baseband signal to produce the data block in an encoded format wherein processing the baseband signal to produce the data block comprises:
sampling the baseband signal to produce a plurality of samples;
pre-equalization processing the plurality of samples; and
equalizing the plurality of samples to produce a plurality of soft decisions corresponding to the RF burst;
combining the plurality of soft decisions of the four RF bursts to form the data block; and
de-interleaving the data block; and
an enCOder/DECoder (CODEC) processing module communicatively coupled to the baseband processor that is operable to:
receive the data block in the encoded format from the baseband processor;
partially decode the data block in the encoded format to extract the USF bits;
fully decode data blocks carrying data bits intended for the wireless terminal; and
encode outgoing data bits to produce outgoing data blocks in an encoded format.

12. The wireless terminal of claim 11, wherein the CODEC processing module decodes the data block in the background when the USF bits have been extracted from the data block.

13. The wireless terminal of claim 11, wherein the data block corresponds to a GSM frame and each RF burst corresponds to a GSM sub-frame.

14. The wireless terminal of claim 11, wherein the wireless terminal supports the GSM standard.

15. The wireless terminal of claim 11, wherein the data block is encoded according to a CS-1 encoding scheme of a GPRS portion of the GSM standard.

16. The wireless terminal of claim 11, wherein:
the data block is encoded according to both an outer encoding scheme and an inner encoding scheme; and
partially decoding the data block includes partially decoding the data block according to only the inner encoding scheme.

17. The wireless terminal of claim 16, wherein:
the outer encoding scheme comprises a linear binary block coding scheme; and
the inner encoding scheme comprises convolutional encoding.

18. The wireless terminal of claim 16, wherein:
the outer encoding scheme comprises Fire encoding; and
the inner encoding scheme comprises convolutional encoding.

19. The wireless terminal of claim 11, wherein the USF bits indicate:
whether a corresponding uplink is available; and
when the corresponding uplink is not available, an indication of a wireless terminal using the uplink.

20. A wireless terminal that comprises:
a Radio Frequency (RF) front end operable to communicate with a servicing base station, wherein the RF front receives four RF bursts from the servicing base station that carries an data block having Uplink State Flag (USF) bits and data bits intended for a differing wireless terminal and to down convert the four RF bursts to produce a baseband signal; and
a baseband processor communicatively coupled to the RF front end that is operable to:
receive the baseband signal from the RF front end and to process the baseband signal to produce the data block in an encoded format;
partially decode the data block in the encoded format to extract the USF bits;
fully decode other data blocks carrying data bits intended for the wireless terminal; and
encode outgoing data bits to produce outgoing data blocks;
wherein the four RF bursts are processed to produce the data blocks, the processing comprising for each of four received RF bursts:
down converting each RF burst to produce a baseband signal;
sampling the baseband signal to produce a plurality of samples;
pre-equalization processing the plurality of samples; and
equalizing the plurality of samples to produce a plurality of soft decisions corresponding to the RF burst;
combining the plurality of soft decisions of the four RF bursts to form the data block; and
de-interleaving the data block.

21. The wireless terminal of claim 20, wherein the baseband processor decodes the data block in the background when the USF bits have been extracted from the data block.

22. The wireless terminal of claim 20, wherein the data block corresponds to a GSM frame and each RF burst corresponds to a GSM sub-frame.

23. The wireless terminal of claim 20, wherein the wireless terminal supports the GSM standard.

24. The wireless terminal of claim 20, wherein the data block is encoded according to a CS-1 encoding scheme of a GPRS portion of the GSM standard.

25. The wireless terminal of claim 20, wherein:
the data block is encoded according to both an outer encoding scheme and an inner encoding scheme; and
partially decoding the data block includes partially decoding the data block according to only the inner encoding scheme.

26. The wireless terminal of claim 20, wherein:
the outer encoding scheme comprises a linear binary block coding scheme; and
the inner encoding scheme comprises convolutional encoding.

27. The wireless terminal of claim 20, wherein:
the outer encoding scheme comprises Fire encoding; and
the inner encoding scheme comprises convolutional encoding.

28. The wireless terminal of claim 20, wherein the USF bits indicate:
whether a corresponding uplink is available; and
when the corresponding uplink is not available, an indication of a wireless terminal using the uplink.

* * * * *

UNITED STATES PATENT AND TRADEMARK OFFICE
CERTIFICATE OF CORRECTION

| | |
|---|---|
| PATENT NO. | : 7,342,956 B2 |
| APPLICATION NO. | : 10/749492 |
| DATED | : March 11, 2008 |
| INVENTOR(S) | : Li Chang et al. |

It is certified that error appears in the above-identified patent and that said Letters Patent is hereby corrected as shown below:

Column 12, line 43, in Claim 1: replace "Unlink" with --Uplink--

Signed and Sealed this

Twenty-ninth Day of July, 2008

JON W. DUDAS
*Director of the United States Patent and Trademark Office*